(12) United States Patent
Kaneko et al.

(10) Patent No.: US 8,073,600 B2
(45) Date of Patent: Dec. 6, 2011

(54) CONTROLLER OF FIELD WINDING TYPE SYNCHRONOUS MOTOR, ELECTRIC DRIVE SYSTEM, ELECTRIC FOUR WHEEL DRIVING VEHICLE, AND HYBRID AUTOMOBILE

(75) Inventors: Satoru Kaneko, Naka (JP); Kenta Katsuhama, Hitachinaka (JP); Shigeru Akaishi, Isesaki (JP); Kazuya Motegi, Ohta (JP); Tatsuyuki Yamamoto, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 952 days.

(21) Appl. No.: 11/914,883

(22) PCT Filed: Jul. 11, 2005

(86) PCT No.: PCT/JP2005/012735
§ 371 (c)(1),
(2), (4) Date: Nov. 19, 2007

(87) PCT Pub. No.: WO2007/007387
PCT Pub. Date: Jan. 18, 2007

(65) Prior Publication Data
US 2009/0071735 A1    Mar. 19, 2009

(51) Int. Cl.
*H02P 5/46* (2006.01)
(52) U.S. Cl. .......... 701/54; 318/109; 318/144; 318/152; 318/400.02
(58) Field of Classification Search .............. 701/54; 318/109, 144, 151, 152, 400.02; *H02P 5/46*
See application file for complete search history.

(56) References Cited

U.S. PATENT DOCUMENTS

| 2003/0020428 A1* | 1/2003 | Masaki et al. ............... 318/727 |
| 2003/0020429 A1* | 1/2003 | Masaki et al. ............... 318/727 |
| 2004/0200654 A1* | 10/2004 | Hatsuda et al. ............. 180/243 |
| 2004/0211613 A1* | 10/2004 | Asao et al. .................. 180/291 |
| 2005/0029890 A1* | 2/2005 | Kadoya et al. .............. 310/180 |

(Continued)

FOREIGN PATENT DOCUMENTS
JP    61-18386 A    1/1986
(Continued)

OTHER PUBLICATIONS

Japanese Search Report dated Oct. 18, 2005 with English translation of relevant portion (Four (4) Pages).
(Continued)

*Primary Examiner* — Tuan C. To
(74) *Attorney, Agent, or Firm* — Crowell & Moring LLP

(57) ABSTRACT

A controller of a field winding type synchronous motor is provided that can stably output torque even if the d-axis current pulsates by reducing torque pulsation without causing fluctuation in the magnetic flux acting on the torque. A motor control unit 100 performs control so that a desired torque can be generated from a field winding type motor 20 having a field winding 22f on the rotor. Based on a current Id flowing in the d-axis direction out of the current flowing in a stator winding 22a of the field winding type motor 20, the motor control unit 100 calculates an induced voltage Vf2 being induced in the field winding 22f and compensates a field voltage Vf of the field winding based on the induced voltage Vf2, thus suppressing pulsation of the field current flowing in the field winding of the field winding type motor 20.

7 Claims, 6 Drawing Sheets

U.S. PATENT DOCUMENTS

| | | | |
|---|---|---|---|
| 2005/0035676 A1* | 2/2005 | Rahman et al. | 310/83 |
| 2005/0093494 A1 | 5/2005 | Nagayama | |
| 2005/0156543 A1* | 7/2005 | Kitamura et al. | 318/109 |
| 2005/0160771 A1* | 7/2005 | Hosoito et al. | 68/12.16 |
| 2006/0017344 A1* | 1/2006 | Tajima et al. | 310/156.53 |
| 2006/0017419 A1* | 1/2006 | Tajima et al. | 318/801 |
| 2006/0097702 A1* | 5/2006 | Nagashima et al. | 322/20 |
| 2006/0119297 A1* | 6/2006 | Okamura et al. | 318/17 |
| 2007/0035270 A1* | 2/2007 | Kitamura et al. | 318/727 |

FOREIGN PATENT DOCUMENTS

| | | |
|---|---|---|
| JP | 63-133886 A | 6/1988 |
| JP | 6-237592 A | 8/1994 |
| JP | 2000-197398 A | 7/2000 |
| JP | 3331734 B2 | 7/2002 |
| JP | 2004-201452 A | 7/2004 |
| JP | 2005-143157 A | 6/2005 |

OTHER PUBLICATIONS

Japanese Office Action dated Jul. 27, 2010 (Three (3) pages).
Form PCT/IB/338, PCT/IB/373, and Form PCT/ISA/237 (Five (5) Pages).

* cited by examiner

CONTROLLER OF FIELD WINDING TYPE SYNCHRONOUS MOTOR, ELECTRIC DRIVE SYSTEM, ELECTRIC FOUR WHEEL DRIVING VEHICLE, AND HYBRID AUTOMOBILE

TECHNICAL FIELD

The present invention relates to a controller which controls a field winding type synchronous motor that generates a magnetic flux by sending a current to a field winding to generate torque based on the magnetic flux, and also to an electric drive system, an electric four wheel driving vehicle, and a hybrid automobile.

BACKGROUND ART

Recent years have seen an increase in the number of motor-driven vehicles including electric vehicles, hybrid automobiles, and other environmentally friendly vehicles. Further, in addition to environmentally friendly vehicles, electric four wheel driving vehicles having an engine for directly driving front wheels and a motor for driving rear wheels are also becoming widely used. As a drive motor for these electric automobiles, a synchronous motor is mainly used because of its compact size and high efficiency. There are several types of synchronous motors: an embedded type permanent magnet motor having an embedded permanent magnet in the rotor, a surface type permanent magnet motor having a permanent magnet attached at the periphery of the rotor, a field winding type synchronous motor having a field winding on the rotor side to draw a current therein to generate a magnetic flux, etc.

All of these synchronous motors have a magnetic flux on the rotor side. There are various methods of having a magnetic flux. For example, a permanent magnet motor includes a permanent magnet on the rotor, and a field winding type motor generates a magnetic flux by sending a current to the field winding. A motor generates torque by drawing a current in a stator winding on the stator side in such a way that the current perpendicularly intersects with the magnetic flux on the rotor side.

As mentioned above, the motor has a magnetic flux; therefore, at high rotational speeds of the motor, an induced voltage occurs according to the rotational speed. The greater the rotational speed of the motor becomes, the higher the induced voltage becomes. If the induced voltage exceeds a system voltage, an adequate current to output a required torque cannot be sent at that rotational speed.

Measures generally taken to restrain the rise of the induced voltage are referred to as "field weakening control." With a permanent magnet motor, field weakening control is achieved by sending a current in the negative direction of the d axis so as to cancel the magnetic flux generated by the rotor in the magnetic flux direction of the rotor (generally in the d-axis direction) out of the stator winding currents. With a field winding type synchronous motor, on the other hand, the magnetic flux can be reduced by directly reducing the field current.

Further, when a field winding type motor is used, the above-mentioned two field weakening control methods are used together in some applications. In this case, as disclosed in Japanese Patent No. 3331734, there are two different methods. In one method, the field current is sent in inverse proportion to the rotational speed. In the other method, the stator winding current is split into a component having the same phase as the induced voltage and a component perpendicularly intersecting therewith (so-called d-axis current and q-axis current, respectively), and each current is controlled. Under the methods disclosed in Japanese Patent No. 3331734, it is possible to generate a desired torque while suppressing a voltage induced by the motor because each of the field current and the d-axis current can be controlled.

Patent reference 1: Japanese Patent No. 3331734

DISCLOSURE OF THE INVENTION

Problems to be Solved by the Invention

With a field winding type synchronous motor, when a field current is drawn to generate a magnetic flux and further a current is drawn in the d-axis direction for field weakening control, the influence by pulsation of the d-axis current may appear in the field winding. That is, a field current If is sent to the field winding to generate a magnetic flux φ. In this case, a required field voltage Vf is applied between the terminals of the field winding. The field current is generally a dc current that tends to constantly generate a magnetic flux φ. When a d-axis current Id is sent to weaken the magnetic flux φ in this case, the d-axis current can also be regarded as a dc current in the magnetic flux direction. Basically, the field winding and the d-axis direction winding do not interfere with each other.

However, if the d-axis current Id that tends to weaken the magnetic flux φ causes pulsation by a disturbance, such as a motor speed fluctuation, a variation of the magnetic flux φ occurs by the pulsation. Thus, if the magnetic flux fluctuates by the pulsation, an induced voltage ef occurs in the field winding. If the induced voltage ef occurs, the field current If fluctuates at the same frequency as a pulsating component of the d-axis current because the field current If is drawn by a potential difference between the field voltage Vf and the induced voltage ef. There has been a problem that the magnetic flux φ is pulsated by fluctuations of the field current If resulting in torque pulsation.

An object of the present invention is to provide a controller of a field winding type synchronous motor that can stably output torque even if the d-axis current pulsates by reducing torque pulsation without causing fluctuations in the magnetic flux acting on the torque, and also provide an electric drive system, an electric four wheel driving vehicle, and a hybrid automobile.

Means for Solving the Problems (1) In order to accomplish the object, the present invention provides a controller of a field winding type synchronous motor including control means for generating a desired torque from a field winding type motor having a field winding on the rotor, wherein the control means controls a voltage applied to the field winding so as to suppress pulsation of the field current flowing in the field winding of the field winding type motor.

This configuration makes it possible to stably output torque even if the d-axis current pulsates by reducing torque pulsation without causing fluctuations in the magnetic flux acting on the torque.

(2) The controller according to (1), wherein: preferably, the control means splits a current flowing in a stator winding of the field winding type motor into a magnetic flux direction of the motor and a direction perpendicularly intersecting therewith, calculates an induced voltage being induced in the field winding based on a current component flowing in the magnetic flux direction of the motor, and compensates the field voltage of the field winding based on the induced voltage.

(3) The controller according to (1), wherein: preferably, the control means calculates an induced voltage in the field winding based on a time variation of the stator winding current flowing in the magnetic flux direction of the motor.

(4) The controller according to (3), wherein: preferably, a time variation of the current flowing in the magnetic flux direction of the motor calculated by the control means is a time variation over a time period that is a predetermined multiple of a control interval of the control means.

(5) The controller according to (3), wherein: preferably, when calculating a time variation of the current flowing in the magnetic flux direction of the motor, the control means performs low-pass filter processing of the stator winding current flowing in the magnetic flux direction of the motor and then calculates the time variation with respect to the current value subjected to the low-pass filter processing.

(6) In order to accomplish the object, the present invention provides an electric drive system, comprising: a field winding type motor having a field winding on the rotor; an inverter which supplies ac power to the field winding type motor; and control means for applying a voltage command to the inverter so that a desired torque can be generated from the field winding type motor; wherein the control means controls a voltage applied to the field winding so as to suppress pulsation of the field current flowing in the field winding of the field winding type motor.

This configuration makes it possible to stably output torque even if the d-axis current pulsates by reducing torque pulsation without causing fluctuations in the magnetic flux acting on the torque.

(7) In order to accomplish the object, the present invention provides an electric four wheel driving vehicle, comprising: a generator which generates power by being driven by an internal combustion engine that drives the first wheels; a field winding type motor having a field winding on the rotor which drives the second wheels, driven by the power generated by the motor generator; an inverter which supplies ac power to the field winding type motor; and control means for applying a voltage command to the inverter so that a desired torque can be generated from the field winding type motor; wherein the control means controls a voltage applied to the field winding so as to suppress pulsation of the field current flowing in the field winding of the field winding type motor.

This configuration makes it possible to stably output torque even if the d-axis current pulsates by reducing torque pulsation without causing fluctuations in the magnetic flux acting on the torque.

(8) In order to accomplish the object, the present invention provides a hybrid automobile, comprising: a field winding type motor having a field winding on the rotor which drives wheels; an inverter which supplies ac power to the field winding type motor; and control means for applying a voltage command to the inverter so that a desired torque can be generated from the field winding type motor; wherein the control means controls a voltage applied to the field winding so as to suppress pulsation of the field current flowing in the field winding of the field winding type motor.

This configuration makes it possible to stably output torque even if the d-axis current pulsates by reducing torque pulsation without causing fluctuations in the magnetic flux acting on the torque.

Effects of the Invention

In accordance with the present invention, it is possible to stably output torque even if the d-axis current pulsates by reducing torque pulsation without causing fluctuations in the magnetic flux acting on the torque.

LIST OF REFERENCE NUMERALS

Figure 1:
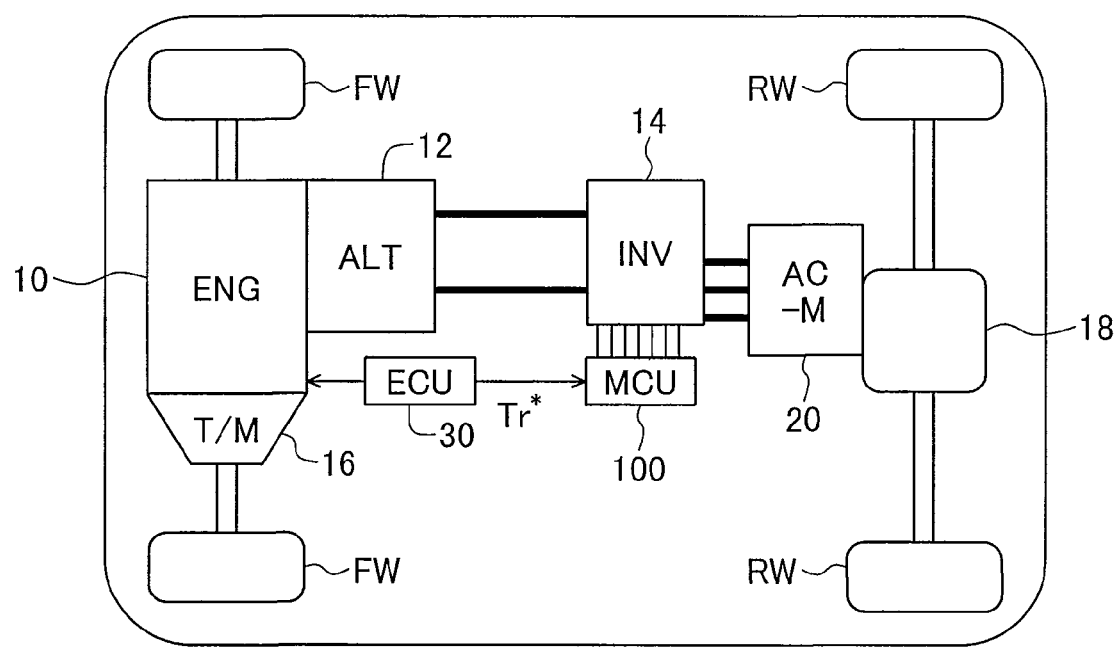
FIG. 1 is a block diagram of a configuration of an electric four wheel driving vehicle mounting a controller of a field winding type synchronous motor according to an embodiment of the present invention.

10 ... Engine
14 ... Inverter
20 ... Field winding type synchronous motor
20A ... Motor generator
22*a* ... Stator winding
22*f* ... Field winding
100 ... Motor control unit
110 ... Current command determination section
130 ... PWM converter
140 ... Motor current detection section
180 ... Id-If noninterference compensation amount calculation section
182 ... Id variation calculation section
184 ... Vf compensation calculation section
190 ... Low-pass filter

BEST MODE FOR CARRYING OUT THE INVENTION

A configuration and an operation of a controller of a field winding type synchronous motor according to an embodiment of the present invention will be explained below with reference to FIGS. 1 to 7.

First, a configuration of an electric four wheel driving vehicle mounting a controller of a field winding type synchronous motor according to the present embodiment will be explained below with reference to FIG. 1.

FIG. 1 is a block diagram of a configuration of an electric four wheel driving vehicle mounting a controller of a field winding type synchronous motor according to an embodiment of the present invention.

Front wheels FW of the electric four wheel driving vehicle are driven by an engine 10, and rear wheels RW by a field winding type synchronous motor 20. The rotational speed of the engine 10 is controlled by an engine control unit (ECU) 30. A generator 12 dedicated for high-voltage dc power generation is driven by the engine 10. Dc power outputted by the generator 12 is converted to ac power by an inverter 14 and then supplied to the motor 20. A motor control unit (MCU) 100 controls the inverter 14 based on a motor torque command value Tr* given from the engine control unit 30 to control a current to be supplied to the stator winding of the motor 20. The motor control unit also controls a current to be sent to a field winding of the motor 20 so that a predetermined torque can be obtained from the motor 20.

The power of the engine 10 is transmitted to the front wheels FW through a transmission 16. The power of the motor 20 is distributed to both right and left sides by a differential gear 18 and then transmitted to the rear wheels RW. A clutch (not shown in the diagram) that opens and closes a power transmission channel is provided between the motor 20 and the differential gear 18.

It may be possible to drive the front wheels with a motor and the rear wheels with an engine.

With an electric four wheel driving vehicle, when a field winding type motor is used as a rear wheel drive motor, a method of sending a current in the d-axis direction and a method of directly reducing a field current are used together in some cases. This makes it possible to obtain a desired torque while suppressing a voltage induced by the motor.

That is, the performance required for a rear wheel drive motor used for an electric four wheel driving vehicle is, first of all, a wide range of operating points. For example, when starting a vehicle in deep snow, it is important that the vehicle can be started only with the rear wheels even if the front wheels completely lose their grip. In this case, it is necessary to output a large torque in a low rotational speed region. Further, when maintaining four wheel driving up to a middle rotational speed region, it is necessary to operate the motor at a remarkably high rotational speed. When it is necessary to satisfy both of a low-speed large torque and a high rotational speed region with a permanent magnet synchronous motor, a magnetic flux of the permanent magnet necessary to generate low-speed large torque adversely affects motor operation such that an induced voltage increases too much in a high rotational speed region making it impossible to drive the motor up to a required high rotational speed region. In contrast, "a field winding type synchronous motor" is effective as a motor having a wide range of operating points used for a large electric four wheel drive system. A field winding type synchronous motor makes it possible to reduce a magnetic flux by suppressing a field current in the high rotational speed region. Accordingly, an induced voltage can be maintained low allowing the motor to be driven up to the high rotational speed region. Further, with an electric four wheel drive system, the output voltage of the generator used as a power source of the rear wheel drive motor is limited by the rotational speed of the engine. For example, when starting the vehicle, a torque enough to start the vehicle is necessary even in a condition where the rotational speed of the engine does not rise sufficiently. In this case, since the motor outputs a large torque with a low voltage, a sufficient torque is not gained if the field current is reduced too much. Therefore, it is necessary to reduce the induced voltage by drawing a d-axis current without reducing the field current too much. Specifically, in the above-mentioned case, the motor control unit 100 for controlling the motor torque controls each of the field current If, the current Id for performing field weakening control, and the current Iq for controlling the torque.

A configuration of a controller of a field winding type synchronous motor according to the present embodiment will be explained below with reference to FIG. 2.

Figure 2:
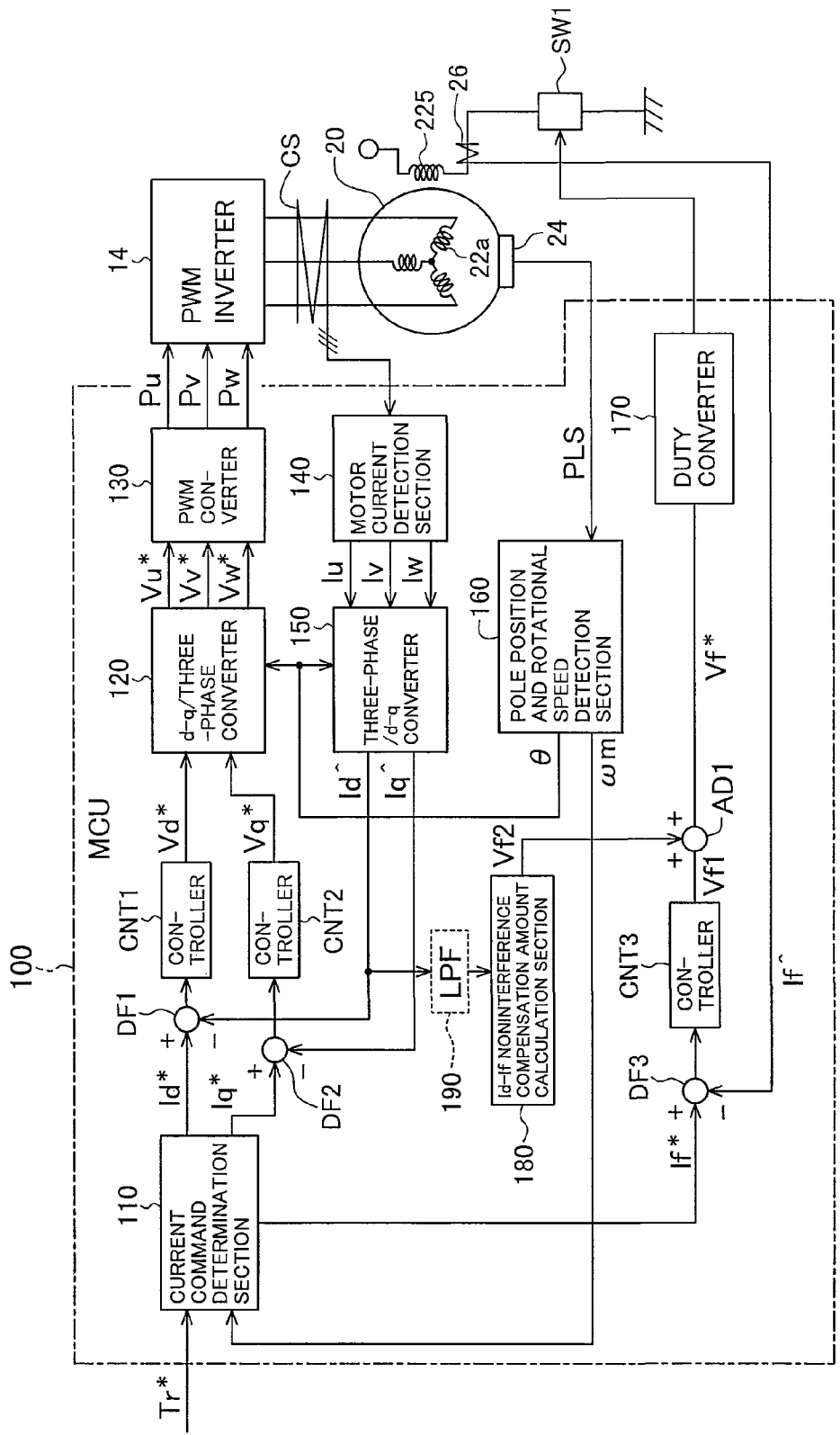
FIG. 2 is a block diagram of a configuration of a controller of a field winding type synchronous motor according to an embodiment of the present invention.

FIG. 2 is a block diagram of a configuration of a controller of a field winding type synchronous motor according to an embodiment of the present invention. Reference numerals that are the same as those of FIG. 1 denote the same section.

A motor control unit 100 shown in FIG. 2 performs feedback control on the d-axis current Id, the q-axis current Iq, and the field current If of the motor 20. A torque command Tr* to be inputted to the motor control unit 100 is given from the engine control unit 30.

The torque command Tr* is outputted by the engine control unit 30 according to the vehicle condition. For example, when the shift position is in the neutral range, the driving mode (MODE) is set to the 2WD mode, and the torque command Tr*, for example, to ONm. When the shift position is in the 1ST range, the driving mode is set to the 4WD standby mode, and the torque command Tr* to a first predetermined value. Further, when the accelerator pedal is depressed, the driving mode is set to the 4WD mode, and then the torque command Tr* is gradually increased up to a second predetermined value (second predetermined value>first predetermined value). Further, if a difference between the front and the rear wheel speeds arises causing a skid, the torque command Tr* is outputted according to the difference between the front and the rear wheel speeds.

The motor control unit 100 includes a current command determination section 110; a d-q/three-phase converter 120; a PWM converter 130; a motor current detection section 140; a three-phase/d-q converter 150; a pole position and rotational speed detection section 160; a duty converter 170; an Id-If noninterference compensation amount calculation section 180; controllers CNT1, CNT2, and CNT3; subtractors DF1, DF2, and DF3; and an adder AD1.

The current command determination section 110 of the motor control unit 100 determines each of a command value Id* of the d-axis current Id, a command value Iq* of the q-axis current Iq, and a command value If* of the field current If based on a torque command Tr* inputted from the engine control unit 30 and a rotational speed ω of the motor detected by the pole position and rotational speed detection section 160. As a method of determining a current command, it is possible to use a method of calculating a current command value based on the torque formula of the motor or a method of searching for each current command value in a data table stored in advance in a ROM area of the controller using Tr* and ω as arguments. Here, a rotor speed ωm of the motor is calculated by the pole position and rotational speed detection section 160 based on a position signal PLS from a position sensor 24 attached to a revolving shaft of the motor 20.

Here, the d-axis current Id and the q-axis current IqIq are not detected directly from the motor current. As shown in FIG. 2, a three-phase current of the motor 20 is detected by a current sensor CS, and physical values Iu, Iv, and Iw of the three-phase ac current are set by the motor current detection section 140. Further, the three-phase/d-q converter 150 calculates detection values Id^ and Iq^ of the d-axis current and the q-axis current, respectively, based on the physical values Iu, Iv, and Iw of the three-phase ac current and a rotor magnetic pole position θ of the motor 20 obtained by the pole position and rotational speed detection section 160.

The subtractor DF1 calculates a difference between the command value Id* of the d-axis current Id and the calculated detection value Id^ of the d-axis current. The subtractor DF2 calculates a difference between the command value Iq* of the q-axis current Iq and the calculated detection value Iq^ of the q-axis current. The controller CNT1 calculates a voltage command Vd* of the d-q coordinates from an output of the subtractor DF1. The controller CNT2 calculates a voltage command Vq* of the d-q coordinates from an output of the subtractor DF2.

The voltage commands Vd* and Vq* are converted to ac voltage signals Vu*, Vv*, and Vw* by the d-q/three-phase converter 120 so as to be applied to the three-phase ac motor 20. Further, the ac voltage signals are subjected to pulse-width modulation (PWM) by the PWM converter 130 to obtain PWM signals Pu, Pv, and Pw for driving switching elements of the inverter 14. Then, based on these PWM signals Pu, Pv, and Pw, voltages are applied to a three-phase stator winding 22a of the motor 20 by the PWM inverter 14. Although the PWM signals are simplified as three lines in FIG. 2, six signals are actually outputted so as to turn six switching elements of the PWM inverter ON or OFF.

As mentioned above, a feedback control system is constituted for each of the d-axis current Id and the q-axis current Iq. Further, the Id-If noninterference compensation amount calculation section 180 is used for noninterference control between the d and q axes in order to compensate the interference of an induced voltage occurring between the d and q axes. This section will be detailed later with reference to FIG. 3.

Here, the motor 20 used in the present embodiment is a field winding type synchronous motor in which the field current If is sent to a field winding 22f to generate a magnetic flux of the rotor. The field current command value If* is determined by the current command determination section 110. The subtractor DF3 calculates a difference between the field current command value If* and a field current detection value If^ detected by a current sensor 26. The controller CNT3 calculates a field voltage command Vf* based on an output of the subtractor DF3. The duty converter 170 performs duty conversion of the field voltage command Vf* and then drives a switching element SW1 so that a voltage equivalent to the field voltage command Vf* be applied to the field winding 22f.

The above is an example of one of the control methods for a field winding type synchronous motor. Under this control method, a feedback loop is provided to control each of the d-axis current Id, the q-axis current Iq, and the field current If. This method allows each current to follow a command value at a predetermined response speed.

Here, a noninterference component generally occurs between the d and q axes in an ac motor. The noninterference components refer to a q-axis induced voltage component eq shown in formula (1) acting on the d-axis voltage and a d-axis induced voltage component ed shown in formula (2) acting on the q-axis voltage.

$$eq = \omega \times Lq \times Iq \quad (1)$$

$$ed = \omega \times (Ld \times Id + \phi) \quad (2)$$

where $\omega$ is an angular velocity [rad/s] of the motor; Ld, a d-axis inductance [H]; Lq, a q-axis inductance [H]; and $\phi$, a field main magnetic flux [Wb].

Since the induced voltage components ed and eq influence the voltage between the d and q axes, they appear as disturbances in each of the d- and q-axis current control systems. The Id-If noninterference compensation amount calculation section 180 is used for noninterference control between the d and q axes in order to compensate the interference of an induced voltage occurring between the d and q axes. The noninterference compensation amount calculation section 180 performs the presumed calculation of induced voltages or equivalents of each of the d and q axes, and compensates voltage commands Vd* and Vq* of the d-q coordinates, which are outputs of current control.

A configuration and operation of the noninterference compensation amount calculation section 180 used for a controller of a field winding type synchronous motor according to the present embodiment will be explained below with reference to FIGS. 3 to 6.

Figure 3:
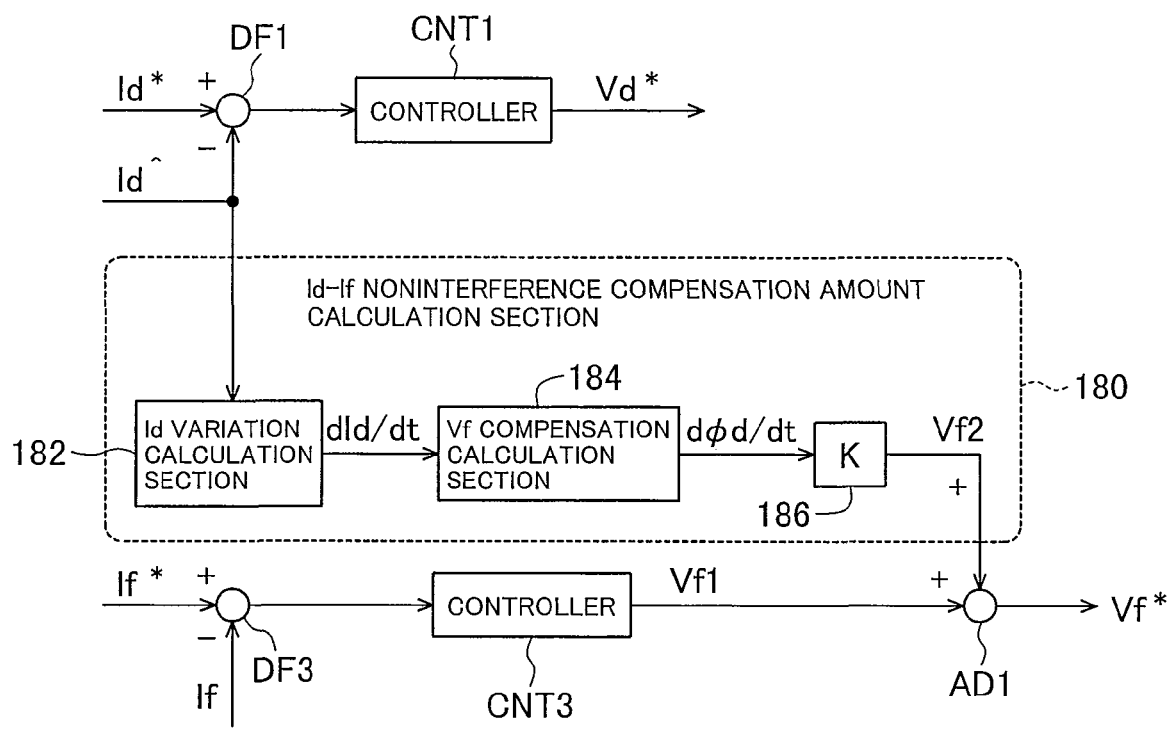
FIG. 3 is a block diagram of a configuration of a noninterference compensation amount calculation section used for a controller of a field winding type synchronous motor according to an embodiment of the present invention.
Figure 4:
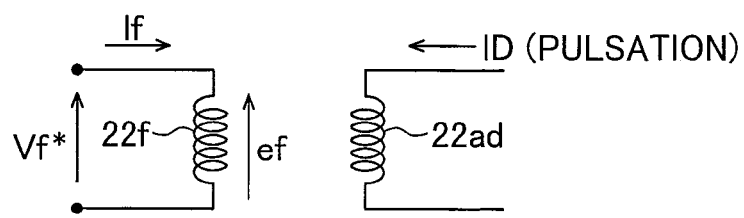
FIG. 4 is a diagram showing a principle of interference in a field winding type synchronous motor according to an embodiment of the present invention.
Figure 5:
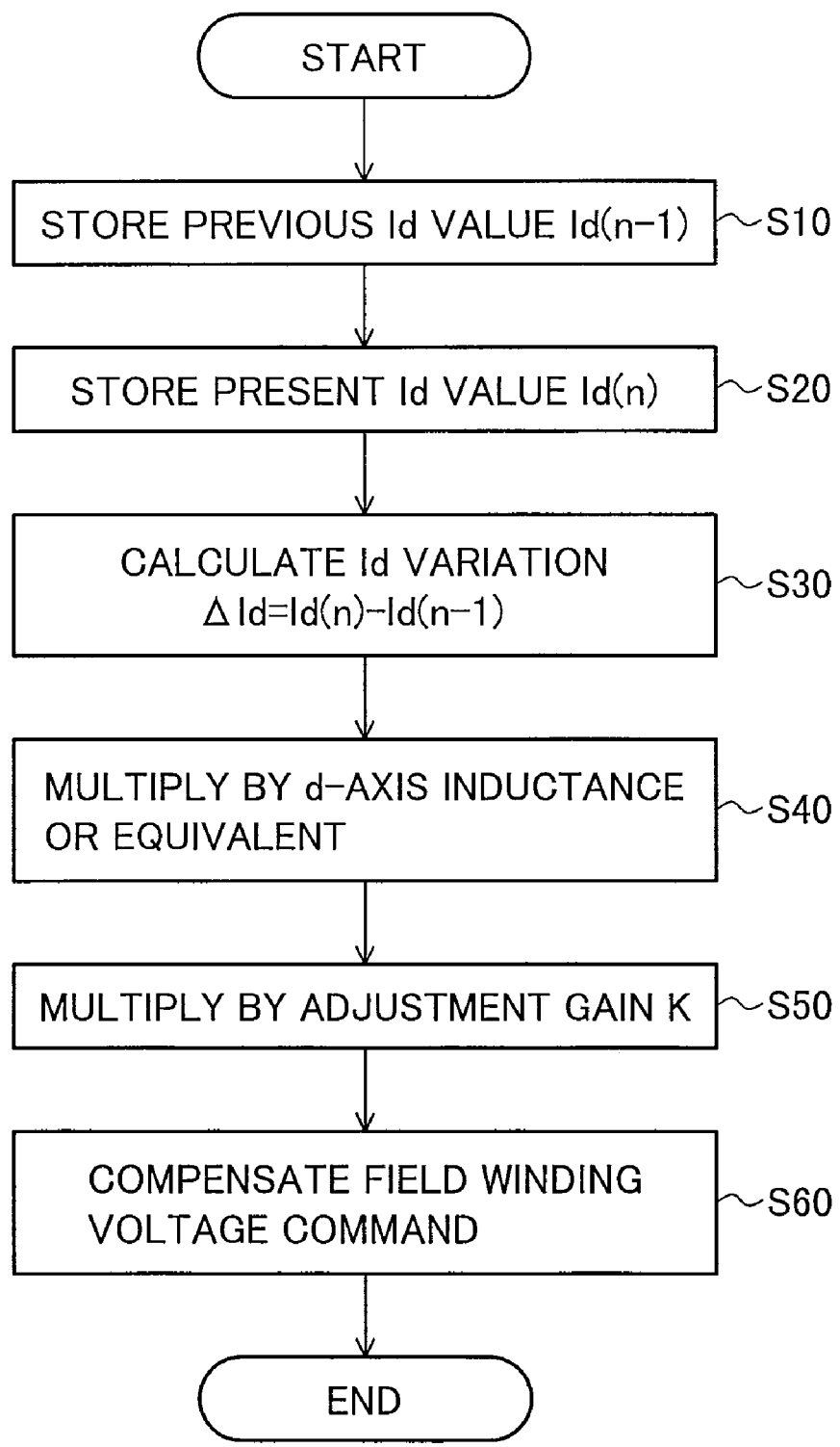
FIG. 5 is a flow chart showing details of noninterference compensation in a field winding type synchronous motor according to an embodiment of the present invention.
Figure 6A:
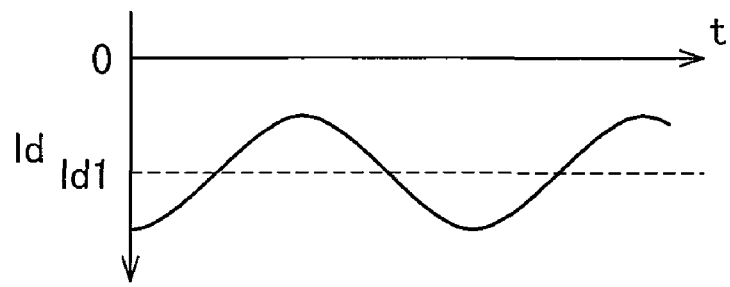
FIGS. 6A to 6C are diagrams showing a principle of noninterference compensation in a field winding type synchronous motor according to an embodiment of the present invention.
Figure 6B:
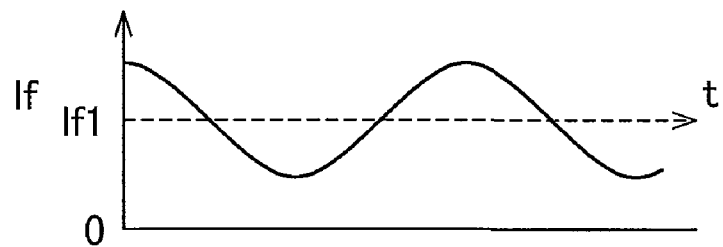
Figure 6C:
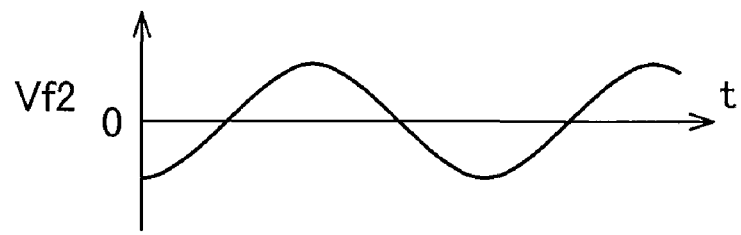

FIG. 3 is a block diagram of a configuration of a noninterference compensation amount calculation section 180 used for a controller of a field winding type synchronous motor according to an embodiment of the present invention. Reference numerals that are the same as those of FIG. 1 denote the same section. FIG. 4 is a diagram showing a principle of interference in a field winding type synchronous motor according to an embodiment of the present invention. FIG. 5 is a flow chart showing details of noninterference compensation in a field winding type synchronous motor according to an embodiment of the present invention. FIGS. 6A to 6C are diagrams showing a principle of noninterference compensation in a field winding type synchronous motor according to an embodiment of the present invention.

With a field winding type synchronous motor used in the present embodiment, the field main magnetic flux $\phi$ generated by sending a current to the field winding and a magnetic flux in a weak direction generated by the d-axis current interfere with each other. A principle of this interference will be explained below with reference to FIG. 4. Generally, a field current If is sent to a field winding 22f to generate a magnetic flux $\phi$. In this case, a necessary field voltage Vf is applied between the terminals of the field winding 22f. Since the field current If is a dc current, it tends to constantly generate the magnetic flux $\phi$. When a d-axis current is drawn to weaken the magnetic flux $\phi$, the d-axis current can also be regarded as a dc current in the magnetic flux direction. Therefore, as a basic rule, the field winding 22f and a d-axis direction winding 22ad of the stator winding do not interfere with each other. However, if pulsation is caused by a disturbance, such as pulsation of the q-axis current, fluctuation of the motor speed, etc. as mentioned above, the magnetic flux is fluctuated by the pulsation of the d-axis current Id since the d-axis current Id tends to weaken the magnetic flux $\phi$. If the magnetic flux is thus fluctuated by the pulsation of the d-axis current, an induced voltage ef occurs in the field winding 22f. If the induced voltage ef occurs, the field current If fluctuates at the same frequency as that of a pulsating component of the d-axis current since the field current If flows by a potential difference between the field voltage Vf and the induced voltage ef. The magnetic flux $\phi$ pulsates by fluctuations of the field current If, which may result in torque pulsation.

A noninterference control method (hereafter referred to as "Id-If noninterference control") of the field current If and the d-axis current by the Id-If noninterference compensation amount calculation section 180 will be explained below with reference to FIG. 3. An object of this control method is to suppress pulsation of the field current If generated by the above-mentioned pulsation of Id and suppress the resultant torque pulsation. FIG. 6A shows a condition where pulsation occurs in the d-axis current Id shown by a solid line when an original d-axis current Id1 shown by a dotted line is flowing. As shown in FIG. 6B, the pulsation of the d-axis current Id causes pulsation of the field current If shown by a solid line when an original field current If1 shown by a dotted line is flowing.

As shown in FIG. 3, the Id-If noninterference compensation amount calculation section 180 includes an Id variation calculation section 182, a Vf compensation calculation section 184, and an adjustment gain multiplier 186. The Id-If noninterference compensation amount calculation section 180 is provided between a feedback control system of the d-axis current Id and a feedback control system of the field current If.

The Id variation calculation section 182 of the Id-If noninterference compensation amount calculation section 180 calculates time variation dId/dt of the d-axis current Id. Specifically, in Step S10 of FIG. 5, the Id variation calculation section 182 stores a previous d-axis current value Id(n−1). Then, in Step S20, the Id variation calculation section 182 stores a present d-axis current value Id(n). Then, in Step S30, the Id variation calculation section 182 calculates a variation ΔId of the d-axis current Id by taking a difference between the values of Step S10 and Step S20.

Then, as shown in Step S40 of FIG. 5, the Vf compensation calculation section 184 of FIG. 3 multiplies the time variation dId/dt of the d-axis current Id (obtained by the Id variation calculation section 182) by a d-axis inductance Ld or an equivalent to calculate a variation Φ d/dt of the induced voltage or an equivalent.

This calculation is based on the fact that the magnetic flux Φd by the d-axis current Id can be represented by the following formula (3).

$$\Phi d = Ld \times Id \quad (3)$$

That is, the Id variation calculation section 182 calculates a time variation of Id, and the Vf compensation calculation section 184 multiplies the obtained value (dId/dt) by the d-axis inductance Ld or an equivalent, thus obtaining a variation of the induced voltage or an equivalent.

Theoretically, it is possible to obtain an induced voltage dΦd/dt caused by pulsation of the d-axis current in response to a field winding voltage command, by multiplying the time variation dId/dt of the d-axis current by the d-axis inductance Ld or an equivalent in the Vf compensation calculation section 184. In fact, it is necessary to take parameter errors and control stability into consideration. Therefore, in Step S50 of FIG. 5, the adjustment gain multiplier 186 of FIG. 3 further multiplies the obtained value (dΦd/dt) by an adjustment gain K to calculate an amount of compensation Vf2. Here, a numerical value around 0.8 to 0.9 is selected as the adjustment gain K.

Further, the amount of compensation Vf2 calculated by the Id-If noninterference compensation amount calculation section 180 is a voltage equivalent to a pulsating component of the d-axis current Id, as shown in FIG. 6C. Then, the amount of compensation Vf2 calculated by the Id-If noninterference compensation amount calculation section 180 is added to a field winding voltage command Vf1 by the adder AD1, and then inputted to the duty converter 170 as a field winding voltage command Vf* subjected to noninterference compensation (Step S60 of FIG. 5).

As mentioned above, it is possible to suppress pulsation of the field winding current and torque pulsation by obtaining an induced voltage component occurring in the field winding by pulsation of the d-axis current through a calculation of the time variation of the d-axis current and then compensating the obtained value in response to a field winding voltage command.

Here, a time interval (dt) for obtaining the time variation dId/dt of the d axis is determined by the sampling interval of the controller and the frequency and amplitude, etc. of noise contained in a detected d-axis current. In fact, a calculation load can be reduced by taking a current variation over a time period that is an integral multiple of the sampling interval. Further, if the detected d-axis current contains noise making it difficult to correctly calculate a time variation, a noise component contained in the current is eliminated by passing a d-axis current detection value through a low-pass filter 190, as shown by a dashed line of FIG. 2 to make it easier to detect a variation of the actual d-axis current.

A configuration of a hybrid automobile mounting a controller of a field winding type synchronous motor according to an embodiment of the present invention will be explained below with reference to FIG. 7.

Figure 7:
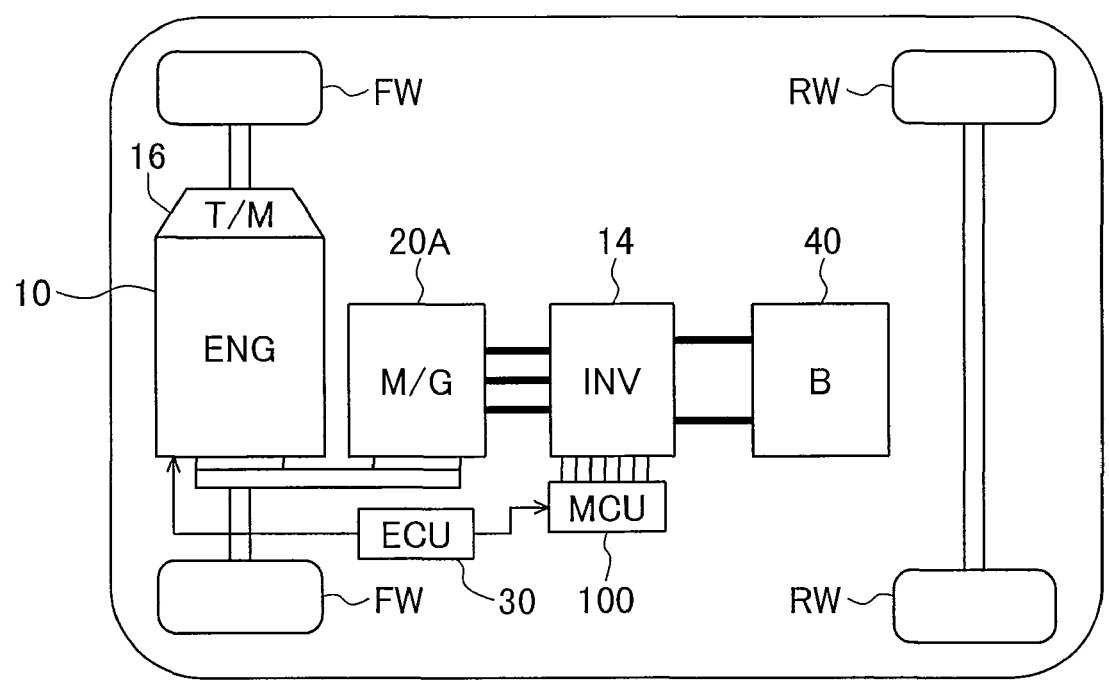
FIG. 7 is a block diagram of a configuration of a hybrid automobile mounting a controller of a field winding type synchronous motor according to an embodiment of the present invention.

FIG. 7 is a block diagram of a configuration of a hybrid automobile mounting a controller of a field winding type synchronous motor according to an embodiment of the present invention. Reference numerals that are the same as those of FIG. 1 denote the same section.

With the hybrid automobile, front wheels FW are driven by an engine 10 and a motor generator 20A. The power of the engine 10 and the motor generator 20A is transmitted to the front wheels FW through a transmission 16. Here, the motor generator 20A having the same configuration as that of the field winding type synchronous motor of FIG. 1 is driven by the engine 10 and stores the generated power in a battery 40. Further, the motor generator 20A is driven by the power of the battery 40 to drive the engine 10 and restart it after an idling stop. Further, the motor generator 20A is driven by the power of the battery 40 to drive the front wheels FW. Here, ac power outputted by the motor generator 20A is converted to dc power by an inverter 14 and then stored in the battery 40. Further, the dc power of the battery 40 is converted to ac power by the inverter 14 and then supplied to the motor generator 20A.

The rotational speed of the engine 10 is controlled by an engine control unit (ECU) 30. A motor control unit (MCU) 100 controls the inverter 14 based on a motor torque command value Tr* given from the engine control unit 30 to control a current to be supplied to a stator winding of the motor generator 20A. The motor control unit also controls a current to be sent to a field winding of the motor generator 20A so that a predetermined torque can be obtained from the motor generator 20A.

Here, the configuration of the motor control unit 100 is the same as that shown in FIG. 2. Also with the present embodiment, the motor control unit 100 includes a noninterference compensation amount calculation section 180 making it possible to suppress torque pulsation of the motor generator 20A by applying Id-If noninterference control according to the present invention.

In accordance with the present embodiment, as explained above, the time variation of the d-axis current is calculated and then operation is performed so as to compensate an induced voltage occurring in the field winding based on the time variation, thus making it possible to suppress torque pulsation.

The invention claimed is:

1. A controller of a field winding type synchronous motor having a control means for performing control so as to generate a desired torque from a field winding type motor having a field winding on the rotor, wherein:
    said control means calculates an induced voltage being induced in the field winding by the pulsation of a d-axis current flowing in the magnetic flux direction of the motor, based on change amount in time of the d-axis current so as to suppress pulsation of a field current flowing in the field winding of the field winding type motor when pulsation is occurring on the d-axis current flowing in the magnetic flux direction of the motor, and compensates a field voltage of the field winding based on the induced voltage.

2. The controller of a field winding type synchronous motor according to claim 1, wherein:
said control means calculates an induced voltage in the field winding based on a time variation of the stator winding current flowing in the magnetic flux direction of the motor.

3. The controller of a field winding type synchronous motor according to claim 2, wherein:
a time variation of the current flowing in the magnetic flux direction of the motor calculated by said control means is a time variation over a time period that is an predetermined multiple of a control interval of said control means.

4. The controller of a field winding type synchronous motor according to claim 2, wherein:
when calculating a time variation of the current flowing in the magnetic flux direction of the motor, said control means performs low-pass filter processing of the stator winding current flowing in the magnetic flux direction of the motor and then calculates the time variation with respect to the current value subjected to the low-pass filter processing.

5. An electric drive system, comprising:
a field winding type motor having a field winding on the rotor;
an inverter which supplies ac power to said field winding type motor; and
control means for applying a voltage command to said inverter so that a desired torque can be generated from said field winding type motor;
wherein said control means controls a voltage applied to the field winding by the pulsation of a d-axis current flowing in the magnetic flux direction of then motor, based on change amount in time of the d-axis current so as to suppress pulsation of a field current flowing in the field winding of said field winding type motor when pulsation is occurring on the d-axis current flowing in the magnetic flux direction of the motor, and compensates a field voltage of the field winding based on the induced voltage.

6. An electric four wheel driving vehicle, comprising:
a generator which generates power by being driven by an internal combustion engine that drives the first wheels;
a field winding type motor having a field winding on the rotor which drives the second wheels, driven by the power generated by said motor generator;
an inverter which supplies ac power to said field winding type motor; and
control means for applying a voltage command to said inverter so that a desired torque can be generated from said field winding type motor;
wherein said control means controls a voltage applied to the field winding by the pulsation of a d-axis current flowing in the magnetic flux direction of the motor, based on change amount in time of the d-axis current so as to suppress pulsation of a field current flowing in the field winding of said field winding type motor when pulsation is occurring on the d-axis current flowing in the magnetic flux direction of the motor, and compensates a field voltage of the field winding based on the induced voltage.

7. A hybrid automobile, comprising:
a field winding type motor having a field winding on the rotor which drives wheels;
an inverter which supplies ac power to said field winding type motor; and
control means for applying a voltage command to said inverter so that a desired torque can be generated from said field winding type motor;
wherein said control means controls a voltage applied to the field winding by the pulsation of a d-axis current flowing in the magnetic flux direction of the motor, based on change amount in time of the d-axis current so as to suppress pulsation of a field current flowing in the field winding of said field winding type motor when pulsation is occurring on the d-axis current flowing in the magnetic flux direction of the motor, and compensates a field voltage of the field winding based on the induced voltage.

* * * * *